(12) United States Patent
Tseng et al.

(10) Patent No.: US 10,275,194 B2
(45) Date of Patent: Apr. 30, 2019

(54) ELECTRONIC DEVICE FOR FILE CONVERSION

(71) Applicant: AVISION INC., Hsinchu (TW)

(72) Inventors: Cheng-Chen Tseng, Hsinchu County (TW); Chen-Chang Li, Miaoli County (TW); Xiang-Chi Lee, Taoyuan (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 15/877,176

(22) Filed: Jan. 22, 2018

(65) Prior Publication Data

US 2018/0225074 A1    Aug. 9, 2018

(30) Foreign Application Priority Data

Feb. 3, 2017    (TW) .............................. 106103754 A

(51) Int. Cl.
*G06F 15/00*    (2006.01)
*G06F 3/12*    (2006.01)
*H04N 1/04*    (2006.01)
*G06F 17/30*    (2006.01)
*H04N 1/00*    (2006.01)

(52) U.S. Cl.
CPC .......... *G06F 3/1247* (2013.01); *G06F 3/1285* (2013.01); *G06F 17/30005* (2013.01); *H04N 1/00204* (2013.01); *H04N 1/0402* (2013.01)

(58) Field of Classification Search
CPC ................. G06F 3/1247; G06F 3/1285; G06F 17/30005; H04N 1/0402; H04N 1/00204
USPC .......................................................... 358/1.15
See application file for complete search history.

(56) References Cited

U.S. PATENT DOCUMENTS

2009/0052804 A1*    2/2009    Lewis ............... G06F 17/30011
                                                                   382/298
2018/0160008 A1*    6/2018    Osada .................. H04N 1/3263

FOREIGN PATENT DOCUMENTS

TW    201334504 A    8/2013
TW    201421968 A    6/2014

OTHER PUBLICATIONS

TW Office Action dated May 16, 2018 in application No. 106103754.

* cited by examiner

*Primary Examiner* — Saeid Ebrahimi Dehkordy

(57) ABSTRACT

An electronic device for file conversion includes a receiving end, a storage medium, a processor and a transmitting end. The receiving end is configured to receive a data source code. The processor is electrically connected to the receiving end and the storage medium, and is configured to store the data source code into the storage medium and convert the data source code, stored in the storage medium, into printing data. The transmitting end is electrically connected to the processor, and is configured to transmit the printing data to a printing apparatus via a network.

7 Claims, 6 Drawing Sheets

ELECTRONIC DEVICE FOR FILE CONVERSION

CROSS-REFERENCE TO RELATED APPLICATIONS

This non-provisional application claims priority under 35 U.S.C. § 119(a) on Patent Application No(s). 106103754 filed in Taiwan, R.O.C. on Feb. 3, 2017, the entire contents of which are hereby incorporated by reference.

BACKGROUND

Technical Field

This disclosure relates to an electronic device for file conversion, and particularly to an electronic device which is associated with a scanning apparatus and a printing apparatus.

Related Art

Generally, if a user would like to print a digital file after scanning a document by a scanning apparatus to obtain the digital file, the user needs to read the digital file via a computer by himself/herself, and complete the setting of a specific printing apparatus, so as to obtain a printout of the digital file. However, the above process not only wastes time but also is insufficiently intuitive for most of users.

Furthermore, scanning apparatuses and printing apparatuses of various manufacturers have their own file forms. These file forms may incompatible with each other. Moreover, the modern technology has not yet provided a medium which is capable of allowing the scanning apparatus and the printing apparatus to work with each other, so that system integration cannot be fulfilled based on the existing hardware resource. Therefore, it causes energy waste.

As recited in Taiwan R.O.C. Patent No. 101103717, in order to achieve such environmental-friendly system integration, integration of the scan file forms and the print file forms of every brand has to be developed.

SUMMARY

According to one or more embodiments, an electronic device for file conversion includes a receiving end, a storage medium, a processor and a transmitting end. The receiving end is configured to receive a data source code. The processor is electrically connected to the receiving end and the storage medium, and is configured to store the data source code into the storage medium and convert the data source code, stored in the storage medium, into printing data. The transmitting end is electrically connected to the processor, and is configured to transmit the printing data to a printing apparatus via a network.

As described above, in an embodiment, the electronic device for file conversion is coupled to an external scanning apparatus. In another embodiment, the electronic device for file conversion is built in a scanning apparatus. After receiving a data source code, the electronic device is able to directly convert the data source code into printing data, or is able to convert the data source code into image data in advance and then convert the image data into the printing data. Afterwards, the electronic device transmits the printing data to a printing apparatus by a network. Both of the acquisition of the data source code and the conversion between the data source code and the printing data can be respectively executed by specific software development kits.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
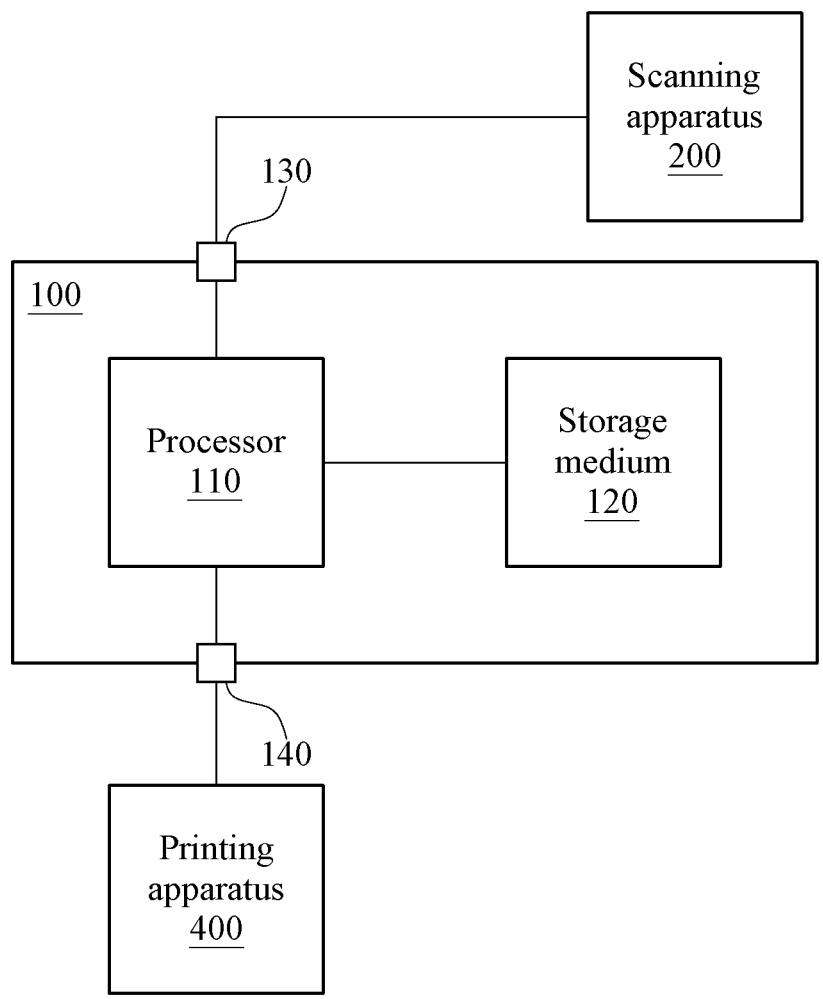
FIG. 1 is a functional block diagram of an electronic device for file conversion in an embodiment of this disclosure.

FIG. 1 is a functional block diagram of an electronic device for file conversion in an embodiment of this disclosure. As shown in FIG. 1, an electronic device 100 for file conversion includes a processor 110, a storage medium 120, a receiving end 130 and a transmitting end 140. The receiving end 130 can be an input port of the electronic device 100, a physical receiver or a software module, which is not limited in this disclosure. The processor 110 can be a field programmable gate array (FPGA), a complex programmable logic device (CPLD), an application-specific integrated circuit (ASIC), a microcontroller unit (MCU), an advanced RISC machine (ARM) or other electronic device which is applied to execute data computing and data processing. This disclosure does not intend to limit the type of the processor 110. The storage medium 120 is, for example, a volatile storage medium or a non-volatile storage medium. The transmitting end 140 can be an output port of the electronic device 100, a transmitter or a software module, which is not limited in this disclosure.

The receiving end 130 is configured to receive a data source code, which can be digital data generated when a scanning apparatus 200 scans a document. In the market, because the forms accepted by various scanning apparatuses are various, so that the forms of data source codes may be various.

The processor 110 is configured to convert a data source code into a piece of printing data. In this embodiment, the processor 110 is able to further convert the data source code into a piece of image data and then convert the image data into the printing data. The form of the image data is, for example, Bitmap (BMP), Joint Photographic Experts Group (JPEG), Tagged Image File Format (TIFF), or other image form. The form of the printing data is, for example, Printer Command Language (PCL) XL, PostScript (PS), Portable Document Format (PDF), Graphics Device Interface (GDI) or other printing form.

For example, the processor 110 is able to determine the type of the data source code and carry out the conversion between the data source code and the printing data according to a program library. The processor 110 is also able to carry out the conversion between the image data and the printing data according to another program library. Later, the process of the conversion will be described in detail.

In another embodiment of this disclosure, the processor 110 is also able to directly convert the data source code into the printing data without converting the data source code into the image data in advance.

In an embodiment of this disclosure, when the data transmission rate of the data source code, transmitted from the scanning apparatus 200, is higher than a threshold value, the processor 110 cannot immediately convert the received data source code into the printing data. At this time, the processor 110 stores the received data source code into the storage medium 120, and then gradually converts the data source code stored in the storage medium 120 into the printing data.

Afterwards, the transmitting end 140 is configured to transmit the printing data to a printing apparatus 400 via the network.

In yet another embodiment of this disclosure, the image data can be provided by the scanning apparatus 200 to the receiving end 130. Then, the processor 110 is able to transmit the printing data to the printing apparatus 400 via the network after the conversion between the image data and the printing data is performed.

Figure 2:
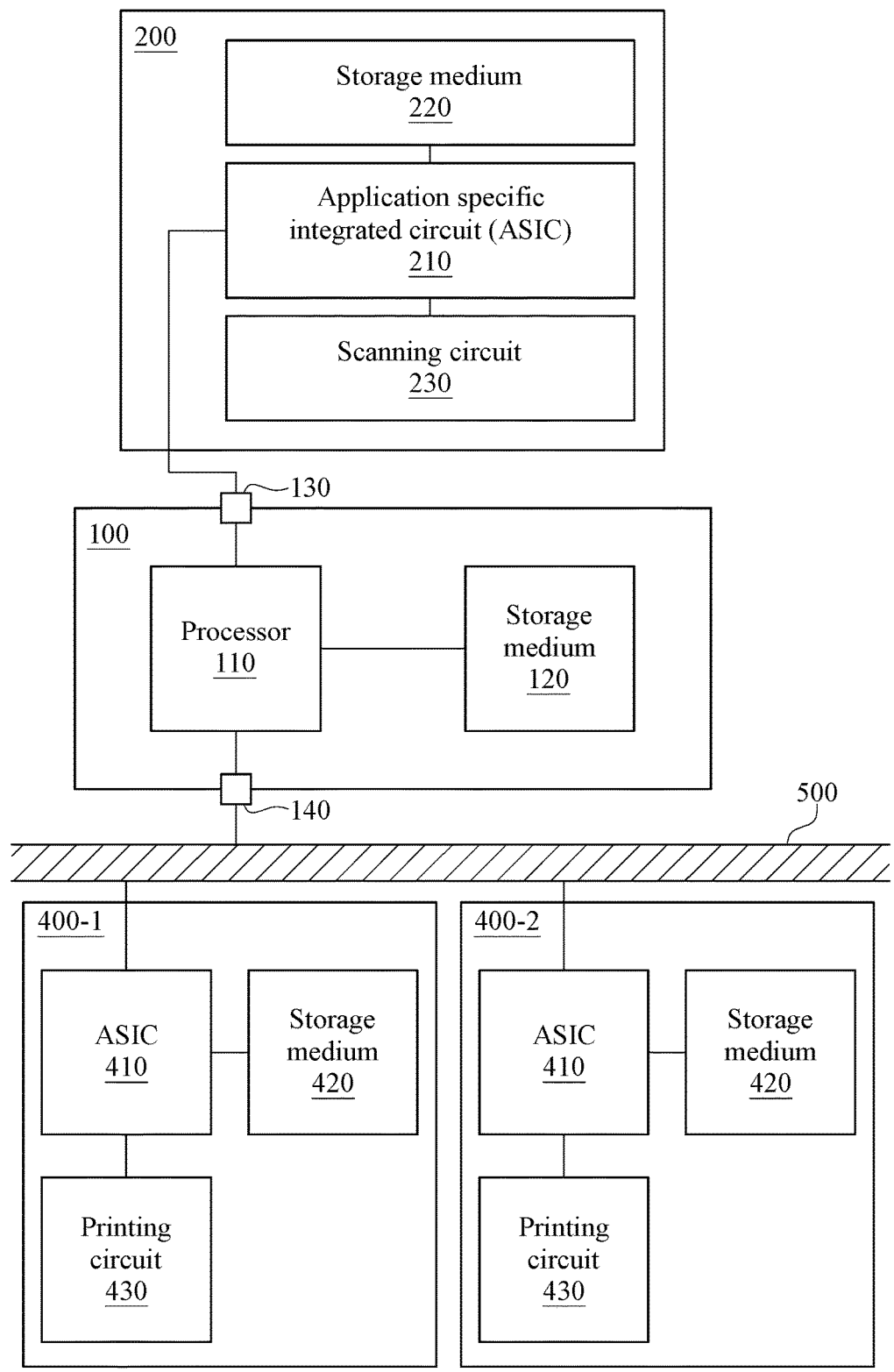
FIG. 2 is a schematic diagram of implementation of an electronic device for file conversion in an embodiment of this disclosure.

FIG. 2 is a schematic diagram of implementation of an electronic device for file conversion in an embodiment of this disclosure. As shown in FIG. 2, the scanning apparatus 200 includes an application specific integrated circuit (ASIC) 210, a storage medium 220 and a scanning circuit 230.

The scanning circuit 230 is configured to scan the content of a document to generate metadata, and the ASIC 210 processes (converts) the metadata to produce the data source code or the image data. The storage medium 220 is configured to temporarily store the data source code or the image data which has not been output yet.

The electronic device 100 includes the receiving end 130, the processor 110, the storage medium 120 and the transmitting end 140. In this embodiment, the receiving end 130 of the electronic device 100 is coupled to an external scanning apparatus 200 and the transmitting end 140 of the electronic device 100 is connected to a network 500. The network 500 is not limited to be an Intranet or an Internet. The electronic device 100 is able to communicate with the printing apparatus 400-1 and/or the printing apparatus 400-2 via the network 500. The scanning apparatus 200 can be a variety of types of scanners or other image capturing apparatus; but it is not limited to this example.

In an embodiment, each of the printing apparatuses 400-1 and 400-2 includes an ASIC 410, a storage medium 420 and a printing circuit 430. The ASIC 410 is used to receive the printing data and then control the printing circuit 430 to print the printing data on paper. The storage medium 420 is configured to temporarily store a part of the printing data, which is received by the ASIC 410 but has not been output via the printing circuit 430. The printing apparatuses 400-1 and 400-2 can be a multifunction printer, a photocopier, a printer or other image outputting apparatus; it is not limited in this disclosure.

In this embodiment, the receiving end 130 receives the data source code from the scanning apparatus 200 outside the electronic device 100.

Please refer to FIG. 1 again. In an embodiment, the printing apparatus 400 has a first software development kit (SDK) and the scanning apparatus 200 has a second SDK. The receiving end 130 obtains the data source code by the second SDK of the scanning apparatus 200. The processor 110 converts the image data into the printing data by the first SDK.

More specifically, please refer to FIG. 2 again. The processor 110 is able to transmit a specific parameter to the second SDK of the scanning apparatus 200 via the receiving end 130, and then the second SDK correspondingly provides the data source code to the receiving end 130. Moreover, if the processor 110 would like to convert the image data into the printing data in PS form, which the printing apparatus 400-1 uses, or XL form, which the printing apparatus 400-2 uses, the processor 110 can, for example, obtain the first SDK from the printing apparatus 400-1, and then execute the first SDK to convert the image data or the data source code into the printing data in XL form. If the processor 110 would like to convert the image data into the printing data in PDF form, the processor 110 can execute the conversion between the image data and the printing data without the first SDK of the printing apparatus 400. Afterwards, the transmitting end 140 transmits the printing data to the printing apparatus 400 via the network 500.

In another embodiment, the electronic device 100 has the first SDK, which corresponds to the printing apparatus 400-1 and the printing apparatus 400-2, and the second SDK, which corresponds to the scanning apparatus 200. The receiving end 130 obtains the data source code by the second SDK, and the processor 110 converts the image data into the printing data by the first SDK.

More specifically, the processor 110 is able to control the scanning apparatus 200 by the built-in second SDK, in order to acquire the data source code via the receiving end 130. Moreover, if the processor 110 would like to convert the image data into the printing data in PS form or XL form, the processor 110 can execute the conversion by the built-in SDK. If the processor 110 would like to convert the image data into the printing data in PDF form, the processor 110 can execute the conversion by other program library instead of the built-in first SDK. Afterwards, the transmitting end 140 transmits the printing data to the printing apparatus 400-1 or 400-2 via the network 500.

Figure 3:
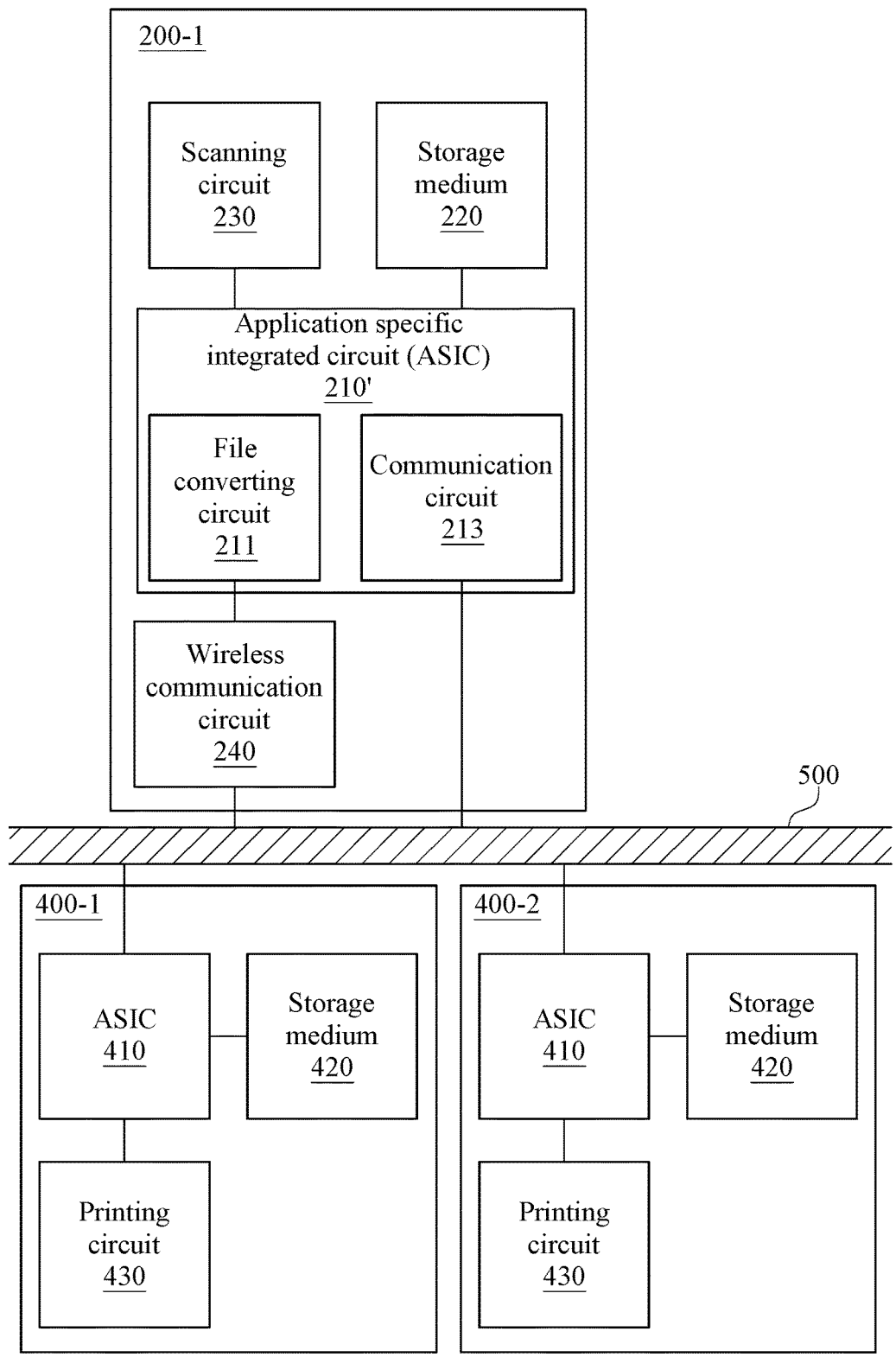
FIG. 3 is a schematic diagram of implementation of an electronic device for file conversion in another embodiment of this disclosure.

FIG. 3 is a schematic diagram of implementation of an electronic device for file conversion in another embodiment of this disclosure. As shown in FIG. 3, the electronic device is built in a scanning apparatus 200-1. The scanning apparatus 200-1 can be a variety of types of scanners or other image capturing apparatus, which is not limited to this disclosure. The scanning apparatus 200-1 includes an ASIC 210', a storage medium 220 and a scanning circuit 230. The ASIC 210' includes a file converting circuit 211 and a communication circuit 213. The file converting circuit 211 is equivalent to the processor 110 in the embodiment as shown in FIG. 1, and the communication circuit 213 is equivalent to the transmitting end 140 in the embodiment as shown in FIG. 1 . The operation of the storage medium 220 with respect to the file converting circuit 211 is equivalent to the operation of the storage medium 120 with respect to the processor 110 in an embodiment as shown in FIG. 1. The printing apparatus 400 is a multifunction printer, a photocopier, a printer or other image outputting apparatus in an example, which is not limited in this disclosure. The scanning apparatus 200-1 generates the data source code and then transmits it to the file converting circuit 211. The file converting circuit 211 is able to communicate with the network 500 via the communication circuit 213 so as to communicate with the printing apparatus 400-1 or 400-2. In this embodiment, the partial circuit of the file converting circuit 211, which communicates with the ASIC 210', is equivalent to the receiving end 130 in the embodiment as shown in FIG. 1, and the communication circuit 213 may be considered to be the transmitting end 140 in the embodiment as shown in FIG. 1. In other words, such a configuration in the embodiment shown in FIG. 3 is the equivalent of a case that the electronic device 100 is built in the scanning apparatus 200-1. Although the form conversion to a file is performed by the file converting circuit 211 in the embodiment as shown in FIG. 3, the form conversion to the file can also be performed by a software function of the ASIC 210' in another embodiment.

In an embodiment, the printing apparatus 400 can have the first SDK and a scanning apparatus 200-1 can have the second SDK. The file converting circuit 211 obtains the data source code by the second SDK of the scanning apparatus 200-1, and converts the image data into the printing data by the first SDK. Afterwards, the file converting circuit 211 transmits the printing data to the printing apparatus 400 via the network 500 by the communication circuit 213. In another embodiment, the scanning apparatus 200-1 can include a wireless communication circuit 240 for exchange of signals with the network 500 by wireless communication.

Although the file converting circuit 211 is installed in the ASIC 210' in the embodiment as shown in FIG. 3, the file converting circuit 211 can be installed outside the ASIC 210", and electrically connected to the ASIC in another embodiment. Please refer to FIG. 4. In this embodiment in FIG. 4, the file converting circuit 211 communicates with the storage medium 220 and the communication circuit 213 via the ASIC 210".

In the embodiment as shown in FIG. 3, the scanning apparatus 200-1 includes the wireless communication circuit 240 besides the communication circuit 213 of the ASIC 210. However, in another embodiment referred to FIG. 5, the scanning apparatus 200-3, which is compared to the scanning apparatus 200-1, merely includes the wireless communication circuit 240 but no communication circuit 213.

In yet another embodiment, similar to the fact that the electronic device 100 is installed in the scanning apparatus 200-1 in the embodiment of FIG. 3, the electronic device 100 can also be installed in the printing apparatus 400. More concretely, the task of the electronic device 100 is to convert a scan file into a file in a readable form for the printing apparatus 400, so the physical location of the electronic device 100 is not limited. The electronic device 100 can be installed in the scanning apparatus 200-1 or the printing apparatus 400, or be configured to have electrical connection/communication connections respectively to the scanning apparatus 200-1 and the printing apparatus 400. This disclosure does not intend to limit the location of the electronic device 100.

Figure 4:
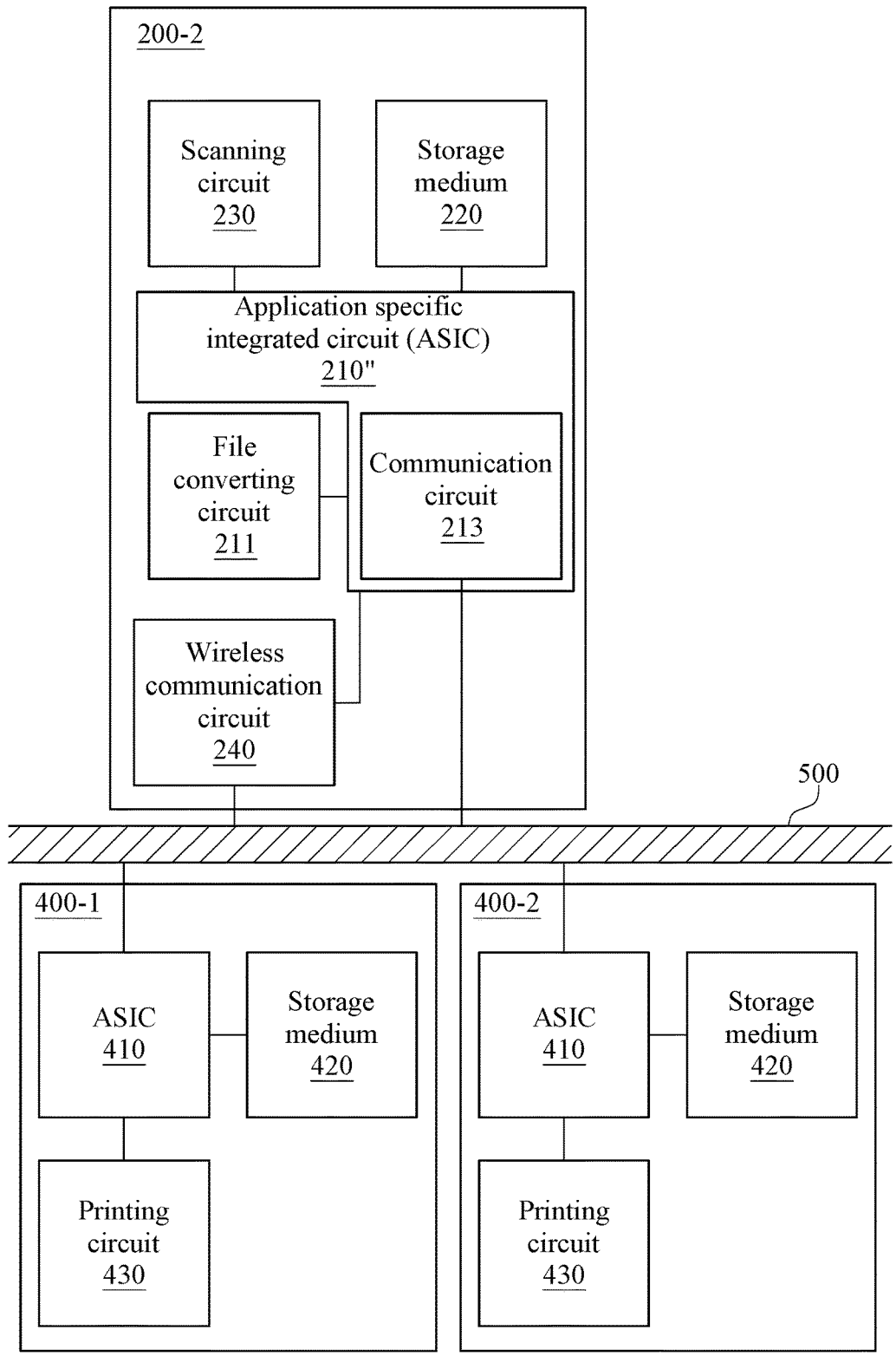
FIG. 4 is a schematic diagram of implementation of an electronic device for file conversion in yet another embodiment of this disclosure.
Figure 5:
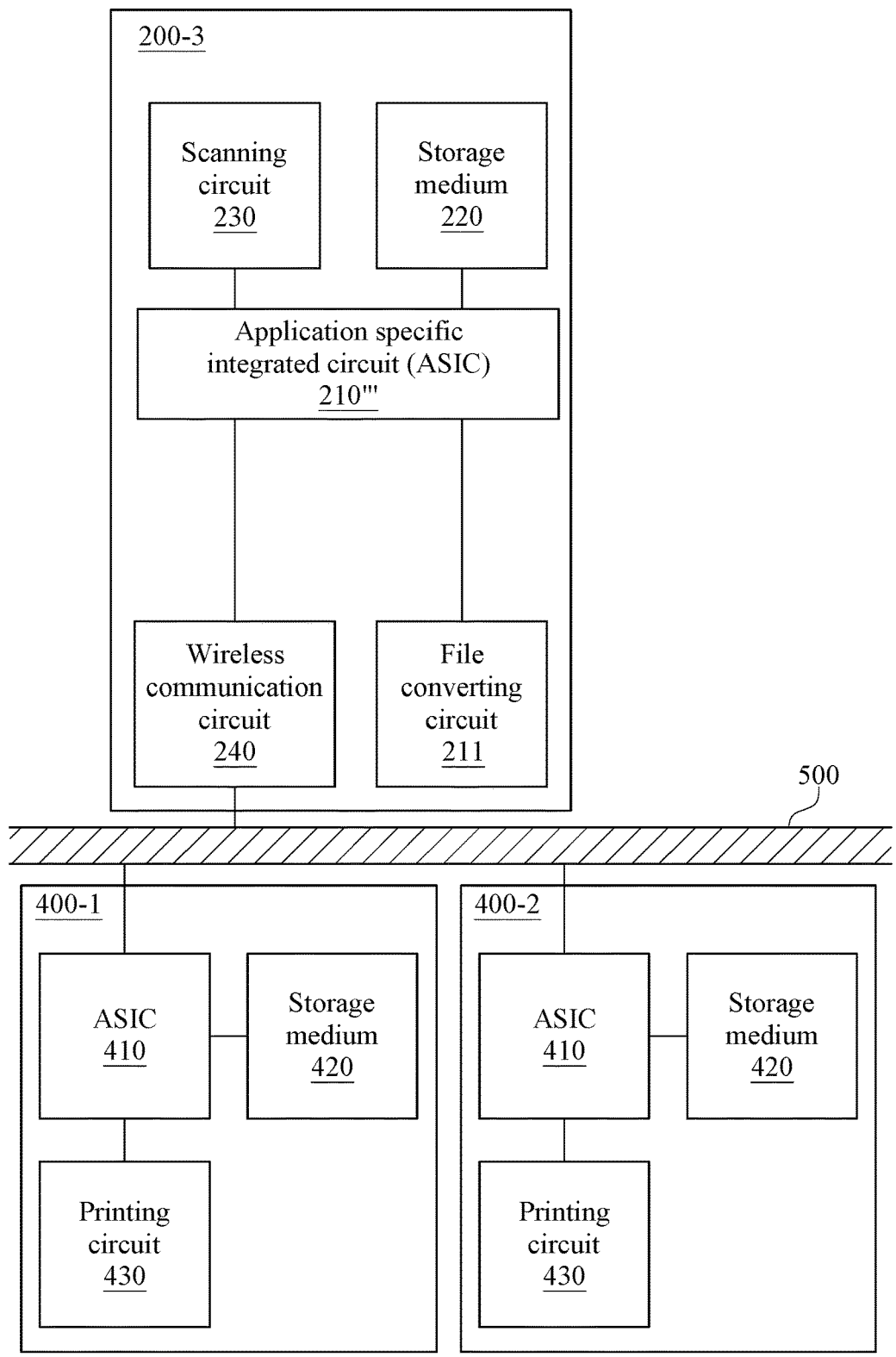
FIG. 5 is a schematic diagram of implementation of an electronic device for file conversion in yet another embodiment of this disclosure.
Figure 6:
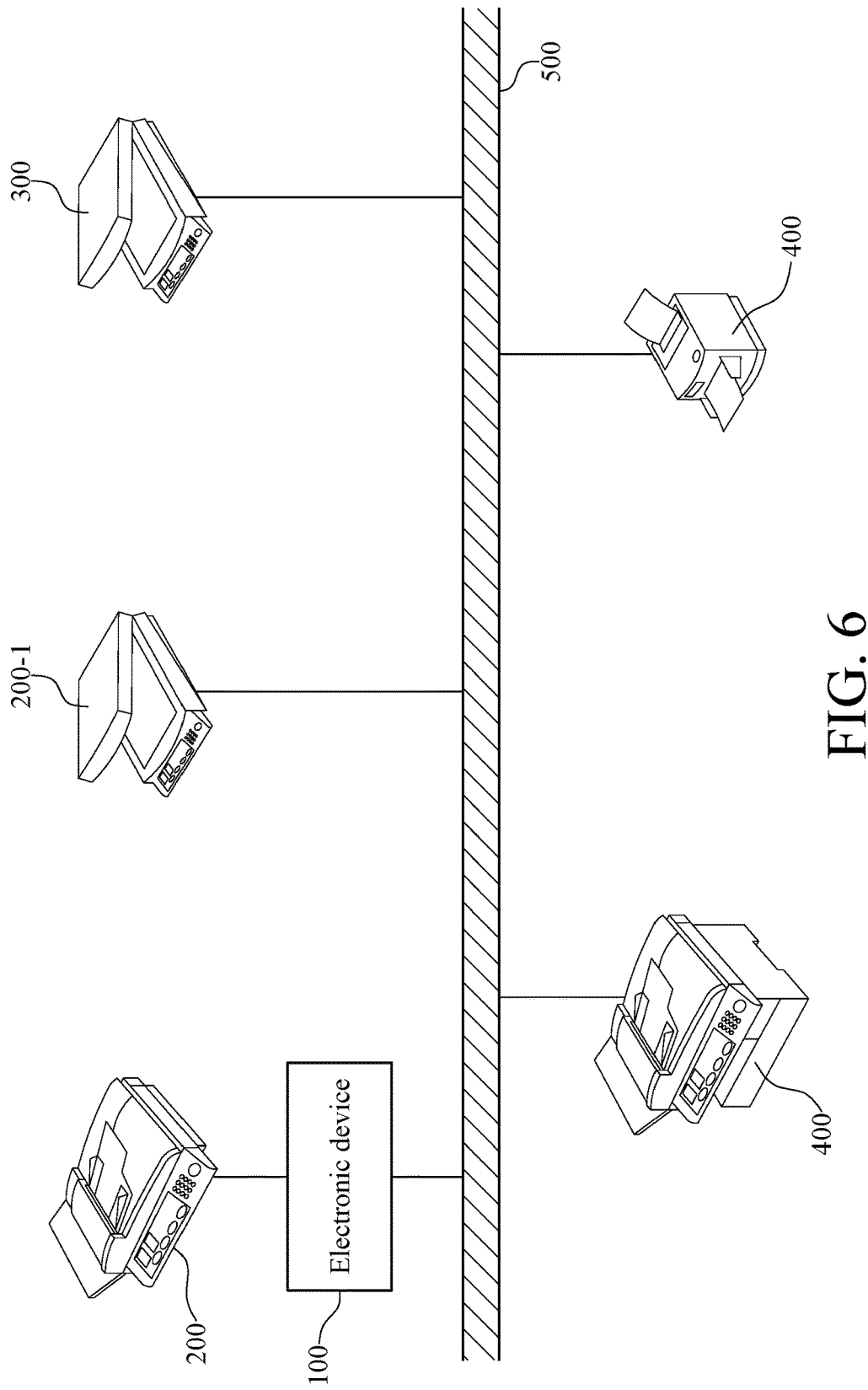
FIG. 6 is a schematic diagram of implementation of an electronic device for file conversion in yet another embodiment of this disclosure.

FIG. 6 is a schematic diagram of implementation of an electronic device for file conversion in yet another embodiment of this disclosure. As aforementioned, the electronic device 100 can be externally connected to the scanning apparatus 200 or be built in the scanning apparatuses 200-1 and 300. After the electronic device 100 receives the data source code which corresponds to the scanning apparatus 200, the electronic device 100 executes file conversion of the data source code and then further transmits the converted file to the printing apparatus 400 via the network 500 so as to straightforwardly complete the output of the file. Therefore, the problems that the printing apparatus 400 cannot determine directly and support the file form of the scan file produced by the scanning apparatus 200, may be resolved. In the embodiments as shown in FIG. 3-5, because each of the scanning apparatuses 200-1 and 300 includes a circuit equivalent to the electronic device 100, the printing data, which is transmitted from the scanning apparatuses 200-1 and 300 to the printing apparatus 400 via the network 500, can be directly processed by the printing apparatus 400.

Furthermore, by the operation of the electronic device 100, the number of electronic devices 100, corresponding to the scanning apparatus 200 and the scanning apparatus 300, is not limited in this disclosure. The electronic device 100 is also able to effectively work in tandem with hardware sources via the network 500. For example, when a user is photocopying by the printing apparatus 400, other users can scan documents by the scanning apparatus 200 and scanning apparatus 300 at the same time. Moreover, by scheduling tasks, these users may obtain the printouts from the printing apparatus 400 finally.

In view of the above description, in an embodiment, the electronic device for file conversion may be coupled to an external scanning apparatus. In another embodiment, the electronic device for file conversion may be built in a scanning apparatus. After receiving a data source code, the electronic device is able to directly convert the data source code into printing data, or convert the data source code into image data in advance and then convert the image data into the printing data. Afterwards, the electronic device transmits the printing data to a printing apparatus by a network. Both of the acquisition of the data source code and the conversion between the data source code and the printing data can be respectively executed by specific software development kits. Therefore, a fast and intuitive operating method of the electronic device for the file conversion may be provided for users and the system integration may be fulfilled based on the existing hardware resource, for the sake of energy conversation.

What is claimed is:

1. An electronic device for file conversion, comprising:
   a receiving port configured to receive a data source code by a built-in second software development kit (SDK) corresponding to a scanning apparatus;
   a storage medium;
   a processor electrically connected to the receiving port and the storage medium, and configured to store the data source code into the storage medium and convert the data source code, which is stored in the storage medium, into a piece of printing data by a built-in first SDK corresponding to a printing apparatus; and
   a transmitting end configured to transmit the printing data to the printing apparatus via a network.

2. The electronic device according to claim 1, wherein the processor further converts the data source code, which is stored in the storage medium, into a piece of image data and then converts the piece of image data into the piece of printing data.

3. The electronic device according to claim 2, wherein a form of the piece of image data is Bitmap (BMP), Joint Photographic Experts Group (JPEG) or Tagged Image File Format (TIFF).

4. The electronic device according to claim 1, wherein the receiving port obtains the data source code from a scanning apparatus outside the electronic device.

5. The electronic device according to claim 1, wherein the electronic device is built in the scanning apparatus which is configured to generates the data source code.

6. The electronic device according to claim 1, wherein the electronic device is built in the printing apparatus.

7. The electronic device according to claim 1, wherein a form of the piece of printing data is Printer Command Language (PCL) XL, PostScript (PS), Portable Document Format (PDF) or Graphics Device Interface (GDI).

* * * * *